United States Patent [19]

Clemens et al.

[11] 4,379,763

[45] Apr. 12, 1983

[54] WASTE WATER TREATMENT BY CHELATION-GELATION

[75] Inventors: Lawrence M. Clemens; Alton J. Gasper, both of Minneapolis, Minn.

[73] Assignee: Minnesota Mining and Manufacturing Company, St. Paul, Minn.

[21] Appl. No.: 197,130

[22] Filed: Oct. 15, 1980

[51] Int. Cl.³ .............................................. G21F 9/16
[52] U.S. Cl. .................................... 252/628; 210/682; 210/688; 210/751
[58] Field of Search ............... 252/628, 631; 210/751, 210/682, 688

[56] References Cited

U.S. PATENT DOCUMENTS

| | | | |
|---|---|---|---|
| 3,298,960 | 1/1978 | Pitzer | 252/301.1 |
| 3,719,050 | 3/1973 | Asao et al. | 61/36 R |
| 3,740,414 | 6/1973 | Olson | 525/334 |
| 4,010,108 | 3/1977 | Gablin et al. | 252/301.1 W |
| 4,056,362 | 11/1977 | Gablin et al. | 23/260 |
| 4,077,901 | 3/1978 | Arnold et al. | 252/301.1 W |
| 4,118,354 | 10/1978 | Harada et al. | 260/29.2 TN |
| 4,131,563 | 12/1978 | Bahr et al. | 252/301.1 W |
| 4,148,745 | 4/1979 | Rudolph et al. | 252/301.1 W |
| 4,156,658 | 5/1979 | Mercer et al. | 252/301.1 W |
| 4,167,491 | 9/1979 | Gablin et al. | 252/301.1 W |
| 4,168,243 | 9/1979 | Gablin et al. | 252/301.1 W |
| 4,309,516 | 1/1982 | Schultz et al. | 525/334 |

FOREIGN PATENT DOCUMENTS 2652957 7/1977 Fed. Rep. of Germany .
48-23690 3/1973 Japan .

Primary Examiner—Deborah L. Kyle
Attorney, Agent, or Firm—Cruzan Alexander; Donald M. Sell; Richard Francis

[57] ABSTRACT

Contaminant components in waste water are complexed with a chelating agent and the complexed component is gelled with a polyurethane prepolymer to provide a gelled mass.

12 Claims, No Drawings

WASTE WATER TREATMENT BY CHELATION-GELATION

TECHNICAL FIELD

This invention relates to a method of treating contaminated waste water. More particularly, this invention relates to complexing the contaminant component in waste water with a chelating agent and gelling the water containing the complexed component with a polyurethane prepolymer to provide a gelled mass.

BACKGROUND ART

Huge volumes of contaminated waste waters are produced daily as a result of industrial processing. Such waste water contains one or more components which may be sufficiently valuable to merit recovery or hazardous to living organisms in the environment, either directly or indirectly. Some examples of contaminants which are sufficiently valuable to merit recovery include silver, gold, and platinum. There are a multitude of different hazardous components, including, for example, radioactive materials, metals, inorganic chemicals and organic chemicals. Examples of sources of serious contamination of waste water include organic chemicals such as pesticides and solvents and residues from electroplating processes, metal mining or refining processes, paint manufacturing, petroleum refining, pharmaceutical production and the production of batteries.

The disposal of radioactive waste water presents a serious burden to power companies and other agencies having to deal with it. Some disposal techniques involve the fixation of the radioactive waste water into a solid form prior to disposal and require that there is little or no bleeding of the water borne radioactive material and/or leaching of radioactive material from the fixed form. Various attempts have been made to accomplish this task, but the results have proven to be undesirable for one or more reasons. Some require the use of cement or other inorganic fixing media which will only fix a minor portion of waste water as compared to the amount of fixing medium required. Others are extremely expensive to use, complicated, and not necessarily effective. Some methods utilize polymeric materials which polymerize in the presence of water to encapsulate or otherwise entrap a certain amount of waste water, but some of the resultant polymers tend to bleed or permit leaching of radioactive materials.

The following references, illustrative of the prior art, disclose various methods of fixing or otherwise restraining the mobility of radioactive hazardous waste water or other waste materials and various related matters.

U.S. Pat. No. 4,156,658 discloses a method for fixing radioactive ions in porous media by injecting into the porous media water-soluble organic monomers which are polymerizable to gel structures with ionic exchange sites.

U.S. Pat. No. 4,077,901 discloses a method of encapsulating toxic waste materials in a vinyl ester resin or an unsaturated polyester by curing the resin under conditions which maintain the integrity of the encapsulating material.

U.S. Pat. No. 3,298,960 discloses a method of disposing of waste solutions by adding a gelling agent such as sodium silicate or formaldehyde to a metal cleaning waste solution which may contain hydrazine and ethylenediaminetetracetic acid or other dissolved hazardous components to provide a solid, vibrant gel.

U.S. Pat. No. 4,167,491 discloses a method of disposing of wet radioactive waste material by combining it with a hydrophilic resin such as urea-formaldehyde dispersion to provide a solid mass with the radioactive waste component distributed therein.

U.S. Pat. No. 4,148,745 discloses mixing radioactive material with phosphoric acid ester and polyvinyl chloride to provide a non-volatile mass which does not flow.

U.S. Pat. Nos. 4,056,362 and 4,168,243 disclose a system for disposing of radioactive waste material by solidifying the liquid components with a water extendable polymer consisting of an aqueous suspension of urea formaldehyde.

U.S. Pat. No. 4,010,108 discloses a method of disposing of wet radioactive material by combining the material with a hydrophilic resin, preferably urea formaldehyde dispersion.

U.S. Pat. No. 4,131,563 discloses a process for preparing toxic waste containing radioactive or toxic substances for safe handling by mixing the same with a polymerizable mixture consisting essentially of monovinyl and polyvinyl compounds and polymerization catalysts to convert the mixture to a solid block.

U.S. Pat. No. 4,118,354 discloses a polyurethane hydrogel which may be prepared by polymerizing polyurethane prepolymers in the presence of liquid wastes which may contain noxious materials and radioactive substances to prevent such materials from being scattered.

U.S. Pat. No. 3,719,050 discloses a soil stabilization method comprising injecting polyurethane prepolymer, alone or in a mixture with water, to the soil and reacting the prepolymer with water in soil to solidify the same.

German Offenlegungsschrift No. 26 52 957 discloses a method of solidifying radioactive waste by mixing with formaldehyde urea prepolymer in the presence of a hardener and a chelating agent.

Japanese Kokai No. 73 23,690, Mar. 27, 1973, discloses a process of eliminating heavy metal ions from waste water by treating the water with a copolymer of alpha amino acids and their salts and acrylamide and methacrylamide.

While some of the methods described above may have some merit, many are deficient in one or more respects. Some produce an encapsulating polymeric structure which provides a shell around a body of hazardous waste water which is prone to rupture and thus cause bleeding of the hazardous material contained therein. Some do not have adequate cohesive strength and thus are subject to rupture, fragmentation, or other deficiencies attendant with the low structural integrity. Some will not cure except at high temperatures and others cure too rapidly for convenient handling. Still others are subject to leaching or hazardous material upon exposure to ground water.

SUMMARY OF THE INVENTION

The present invention provides a method of treating contaminated waste water by chemically complexing the contaminant component therein with a chelating agent and then gelling the water containing the complexed component with a polyurethane prepolymer to provide a self-supporting, transportable gelled mass. The chemically complexed contaminant component is restrained within the gelled mass thereby substantially reducing the possibility of bleeding or the possibility of the contaminant material being leached from the gelled mass by ground water. The gelled mass provides a convenient, handleable body which may be easily transported as such or may be gelled within a container, e.g., a rigid container such as a drum, box, tube, or a flexible container such as a plastic bag or sleeve, without danger or spillage or loss, even upon puncture of the container. The gelled mass may also be reduced in size by evaporation of the water contained therein, since it is permeable to water, substantially without loss of the contaminant material, thereby producing a lighter-weight more convenient to handle body which may then be disposed of or from which the contaminant may be extracted.

The polyurethane prepolymer is characterized by having terminal isocyanate groups formed by reacting polyether polyol having at least two terminal hydroxyl groups and a number average molecular weight between about 3000 and 20,000, preferably 5,000 to 10,000, and having random ethylene oxide units and higher alkylene oxide units in a mole ratio of ethylene oxide to higher alkylene oxide of 1:1 to 4:1, and sufficient polyisocyanate compound having at least two terminal isocyanate groups to provide an NCO:OH ratio of about 5:1 to about 1.05:1. The higher alkylene oxide is selected from the group consisting of polypropylene oxide, butylene oxide, pentylene oxide, hexylene oxide and mixtures thereof.

The chelating agent is a water-dispersible, preferably water-soluble, polymeric material selected from the group consisting of (A) β-hydroxyalkylene amine-containing polymers characterized by having an equivalent weight of hydroxylalkylene amine of 87 to 10,000 and preferably including the moiety

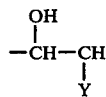

Formula I wherein Y is an amine group; and (B) 2,5-oxolanylene polymer characterized by including recurring 2,5-oxylanylene (or oxolene) units of the formula

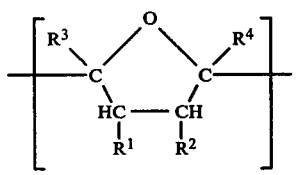

Formula II wherein at least 60% of the units are joined directly to one another so as to provide segments containing at least six units and wherein $R^1$, $R^2$, $R^3$ and $R^4$ are individually hydrogen or alkyl groups containing up to 8 carbon atoms each.

The amount of chelating agent, expressed a dry weight ratio with respect to the polyurethane prepolymer, may, for example, be in the range of about 0.01:1.0 to 1.0:1.0. The amount of chelating agent to polyurethane prepolymer found to be preferably useful is on the order of 0.025:1.0 to 0.05:1.0. The relative amounts specified herein are not to be considered limiting since they may vary according to the conditions encountered in the waste water.

The method involves first complexing the contaminant component with the chelating agent to provide a chemical complex and then gelling the water containing the chemical complex to form a self-supporting, transportable gelled mass. The complexing step preferably is prior to the gelling step but both steps may be accomplished simultaneously. The amount of waste water contained in the mass will, of course, vary depending upon the chemical composition of the polyurethane prepolymer. Typically, the weight ratio of water to prepolymer on a dry weight basis for the prepolymer will be on the order of 10:1.

DETAILED DESCRIPTION

The preferred chelating agents are the water soluble β-hydroxyalkyleneamine-containing polymers that include the moiety of Formula I that result from the reaction of an epoxy (oxirane)-containing polymer with an amine. The amine groups forming the Y-portion of the polymer are preferably derived from piperidine, morpholine, dimethylamine, diethylamine, diethanolamine and mixtures of two or more of these. The equivalent weight of the polymer based on this moiety is 87 to about 10,000. The amine group may be pendant from the polymer backbone, in which case preferred moieties may be represented by the formulae

Formula III wherein $R^5$ is hydrogen or alkyl having one to eight carbon atoms, $R^6$ is alkyl having one to eight carbon atoms or $R^5$ and $R^6$ taken together with the nitrogen atom to which they are attached form a heterocyclic ring havig the formula

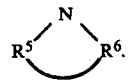

Alternatively, the amine group may be part of the polymer backbone as in the following preferred moieties

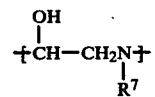

Formula IV wherein $R^7$ is hydrogen or alkyl having one to eight carbon atoms.

An especially preferred class of β-hydroxyalkyleneamine-containing polymers for use according to the present invention are synthesized by epoxidizing butadiene polymer followed by amination as described in U.S. Pat. No. 3,740,414, yielding polymers having the unit

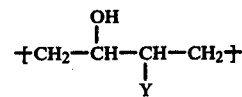

Formula V wherein Y is as defined above in Formula I. Random and block copolymers of butadiene and other copolymerizable monomers such as styrene may also be epoxidized and then aminated to form useful chelating agents.

A sufficient number of units corresponding to Formula V are preferably included to confer water solubility on the aminated polymer.

Another preferred class of the water soluble aminated polymers contains both units corresponding to Formula V and additionally, the moiety

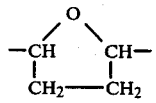

Formula VI

Another class of preferred polymers for use according to the invention is prepared by polymerizing epichlorohydrin and methyl amine according to U.S. Pat. No. 3,732,173 and contain the repeating unit

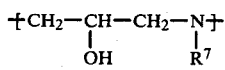

Formula VII wherein $R^7$ is as defined above in Formula IV.

Aminated glycidyl polyacrylates and glycidyl polymethacrylates are also useful and contain the repeating unit

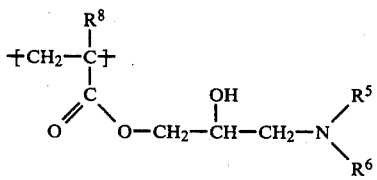

Formula VIII wherein $R^8$ is hydrogen or methyl and $R^5$ and $R^6$ are as defined in Formula III.

Especially preferred polymers of the Formula I type for practicing the invention are formed from the reaction of dimethylamine with epoxidized poly-cis-1,4-butadiene.

Less preferred, but still useful chelating agents, are water-insoluble, but water-dispersible polymers containing the hydroxyalkyleneamine group. It will be appreciated by those skilled in the art that water solubility of polymers containing the structural moieties disclosed in Formulas III through VIII will depend on several factors. The most important factors include the molecular weight of the polymer, equivalent weight based on the hydroxyalkyleneamine moiety, and the contribution of other groups on the polymer backbone to water solubility. Thus a polymer of about 3000 equivalent weight in the moiety corresponding to Formula III where $R^5 = R^6 = C_2H_5$, will be water-insoluble when the rest of the backbone is composed of units corresponding to

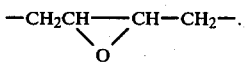

On the other hand a similar polymer with the same hydroxyalkyleneamine content, but with the reminder of the backbone composed of

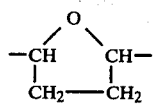

units, i.e., 2,5-oxylanylene units, will be water soluble even though it has the same elemental composition as the water-insoluble material.

Polymers containing blocks of recurring 2,5-oxylanylene without any hydroxyalkyleneamine content are also useful in the practice of the present invention although they are only water-dispersible and not water soluble.

Chelating agents which are not water soluble generally may be made water-dispersible through appropriate selection of solvent or solvent mixture. Examples of such solvents which can be used are methyl alcohol, isopropyl alcohol, acetone, dimethyl formamide, ethyl acetate and butyl "Carbitol". These solvents are added from 10% to 95% of the weight of the chelating agent and the solution is subsequently added to water from 2% to 98% of the water used. All the chelating agents which are not water soluble have been rendered dispersible by this method. Upon dispersion, the chelating agents function effectively to trap waste water contaminants.

The preferred 2,5-oxolanylene polymers comprise (a) from about 10 to 100 mole percent of the units of Formula II;

(b) from about 0 to 90 mole percent of blocks of units of the formula

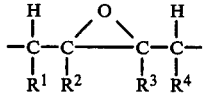

Formula IX (c) from about 0 to 75 mole percent of blocks of units of the formula

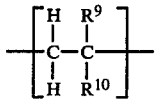

Formula X wherein $R^9$ is hydrogen or methyl and $R^{10}$ is phenyl, cyano or $-COOCH_3$.

As it is used throughout the specification, the term "blocks" means a plurality (e.g., 2 or more) of identical units attached one to the other.

The preferred 2,5-oxolanes polymers are homopolymers containing 100 mole percent of Formula II units, and zero mole percent of Formula IX and X units, wherein $R^1$, $R^2$, $R^3$ and $R^4$ are all hydrogen or $R^1$, $R^2$ and $R^4$ are hydrogen and $R^3$ is an alkyl radical, most preferably methyl. The preferred copolymeric 2,5-oxolanes contain zero mole percent of Formula X units. In such copolymers $R^1$, $R^2$, $R^3$ and $R^4$ are preferably hydrogen.

A preferred subclass of the copolymers are those consisting essentially of blocks of from about 25 to 100 mole percent of Formula II units, blocks of from about 0 to 75 mole percent of Formula IX units and no Formula X units. Again, in this subclass, $R^1$, $R^2$, $R^3$ and $R^4$ are each most preferably hydrogen.

Other groups may be randomly incorporated throughout the polymer chain. Such groups include, for example, olefins, hydroxyls, carbonyls, etc. It does not appear that such groups affect the properties of the polymers, although in some cases they may be up to 15 mole percent of the polymer.

The 2,5-oxolanylene (or oxolane) polymers may be conveniently prepared from preformed diene polymers. These precursor polymers may be homopolymers (e.g., polybutadiene, polyisoprene, etc.) or copolymers. The copolymers may contain only diene units or they may also contain blocks of units resulting from anionically polymerizable olefin (particularly styrene, acrylonitrile and methylmethacrylate units). Examples of commercially available polymer of this type are available under the trade designation "Kraton 1101" (29 weight percent polystyrene, 0.94 specific gravity, principal glass transition temperature of about −90° C.) and available under the trade designation "Kraton 1107" (14 weight percent polystyrene 0.93 specific gravity, principal glass transition temperature of about −60° C.). These polymers, available from Shell Chemical Company, are block copolymers of the A-B-A type. In the polymer available under the trade designation "Kraton 1107", the A units are polystyrene and the B units are polyisoprene.

In any event, the polydienes are derived from the 1,4-polymerization of the diene precursor. The resultant polydiene preferably shows less than 10 percent 1,2- or 3,4-diene addition products since such products interfere with subsequent oxolane formation. The 1,2- and 3,4-diene addition may be suppressed by anionically polymerizing the diene in a non-polar solvent (e.g., cyclohexane). The diene units of the precursor polymers are substantially epoxidized (e.g., 90 mole percent of the diene linkages are converted to oxirane groups) then partially or completely converted to oxolane units to form the poly-2,5-oxolanes. During these reactions the olefin units remain unchanged.

The molecular weight, configurations and end groups of the poly-2,5-oxolanes are determined by the precursor diene polymer. Ordinarily, precursors (and the polyoxolanes prepared from them) are linear and have a degree of polymerization of at least about 100. Thus the sum of the units of Formula II, IX and X in the poly-2,5-oxolanes is at least about 100. A polymer prepared from a polydiene with a degree of polymerization of 100 would have a molecular weight of approximately 7,000. More typically the precursor to polyoxolanes have molecular weights in the range of from about 70,000 to 280,000 (degrees of polymerization of about 1,000–4,000), although they may run as high as about 1,000,000 (degrees of polymerization of about 20,000).

The 2,5-oxolanylene polymers and their preparation are described more fully in the Schultz et al patent application Ser. No. 803,207, filed June 3, 1977, now U.S. Pat. No. 4,309,516 assigned to the present assignee, the disclosure of which patent application is incorporated herein by reference.

The most preferred β-hydroxyalkylene amine-containing polymers include (1) the water soluble reaction product of dimethylamine with partially epoxidized poly-cis-1,4-butadiene, (2) the water soluble reaction product of diethylamine with fully epoxidized poly-cis-1,4-butadiene wherein the unreacted 2,3-epoxybutylene groups are predominantly isomerized to 2,5-oxolanylene groups, (3) the water soluble reaction product of piperidine with polyglycidyl methacrylate, (4) the reaction product of diethylamine with fully epoxidized poly-cis-1,4-butadiene wherein the unreacted 2,3-epoxybutylene groups are not isomerized, (5) the water soluble condensation product of epichlorohydrin and methylamine, (6) water soluble polymer comprising the reaction of an amine selected from the group of dimethylamine, diethylamine, diethanolamine, morpholine, and piperidine, or mixtures thereof with an epoxy containing polymer selected from the group of epoxidized poly-cis-1,4-butadiene, epoxidized styrene-b-butadiene, and epoxidized styrene-co-butadiene.

Water-soluble isocyanate-terminated prepolymers useful in this invention may be expressed in terms of the formula

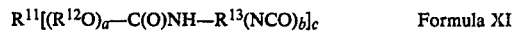

$$R^{11}[(R^{12}O)_a-C(O)NH-R^{13}(NCO)_b]_c \qquad \text{Formula XI}$$

wherein $R^{11}$ is an active hydrogen-free residue of a polyether polyol, e.g., ethylene glycol, glycerol, or 1,1,1-trimethylolpropane, $(R^{12}O)_a$ is a hydrophilic poly(oxyalkylene) chain having a plurality of randomly distributed oxyethylene and higher oxyalkylene units. The subscript "a" is the number of oxyalkylene units in the poly(oxyalkylene) chain, this number being sufficient to impart water-solubility and preferably noncrystallinity to the prepolymer. The moiety —C(O)NH— together with the adjacent oxygen atom of the poly(oxyalkylene) chain is a carbamate (or urethane) group resulting from the reaction of a hydroxy group from polyether polyol precursor with an isocyanate moiety from a polyisocyanate precursor. $R^{13}$ is a residue or nucleus of the polyisocyanate precursor, and is preferably an aromatic nucleus, e.g., tolylene, and "b" is an integer, generally 1–5, where "b" is the number of isocyanate moieties of the polyisocyanate precursor. The subscript "c" is a number equal to the functionality or number of the active-hydrogen atoms in the polyether polyol, and generally "c" will be 2–6. The terminating isocyanate groups can react with water, resulting in the formation of a gelled mass.

Preferred water-soluble prepolymers within the scope of this invention are those of the formula

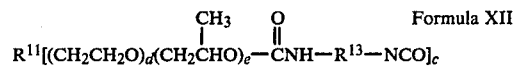

$$R^{11}[(CH_2CH_2O)_d(CH_2\underset{\underset{CH_3}{|}}{C}HO)_e-\overset{O}{\overset{\|}{C}}NH-R^{13}-NCO]_c \qquad \text{Formula XII}$$

wherein $R^{11}$, $R^{13}$, and "c" are as defined above, "d", and "e" are integers such that the ratio of d:e is 1:1 to 4:1.

When these prepolymers are used in the application of this invention, the polyurethane prepolymer reacts with the water mixed with the prepolymer, forming in situ a cross-linked, cured poly(urethane-urea) polymer gel. The mixture of water and prepolymer initially forms a low viscosity solution, typically having a Brookfield viscosity of about 10 to 20 cps at 25° C. (No. 3 spindle at 20 rpm) which, in a very short period of time, cures to form a cross-linked gelled mass having an infinite viscosity.

The polyurethane prepolymers used in the practice of this invention when reacted with water, form a gelled mass in a very short time, e.g., about 5–200 seconds, although the time necessary to gel will vary depending on the ambient temperature, with a longer cure time usually being necessary in colder conditions. The curing time may be extended or shortened by the addition of an appropriate agent. For example, the curing time may be extended by the addition of minor amounts of the aqueous solution of organic acids, e.g., from about 5% to about 50% by weight of 0.01 N oxalic acid or acetic acid. The curing time may be shortened by the addition at appropriate agents such as from about 1% to 10% by weight of dicyanoethylated polypropylene diamine.

The isocyanate-terminated prepolymers used in this invention may be tailored in structure to obtain controlled water-solubility in order to attain practical reaction times and achieve desired physical properties in the gelled mass.

The preparation of isocyanate-terminated prepolymers, such as those used in this invention, and the reaction thereof with water to form a polyurea, is disclosed in the art, e.g., U.S. Pat. Nos. 2,726,219, 2,948,691, 3,719,050, 3,985,688 and Canadian Patent No. 1,035,521 and "Polyurethanes:Chemistry and Technology" by Saunders and Frisch, Part I, Interscience Pub., N.Y. (1962).

The urethane prepolymers used in this invention can be prepared by reacting an aliphatic or aromatic polyisocyanate with a polyoxyalkylene polyol using an NCO/OH equivalent ratio in the range of about 5:1 to about 1.05:1.

To insure water-miscibility, the polyether polyol will generally have a molecular weight range of about 3,000–20,000, preferably 5,000 to 10,000. Commercially available polyol precursors useful in making the above described water-soluble isocyanate-terminated prepolymers are the hydrophilic polyols, e.g., "Carbowax". The degree of overall hydrophilicity of the prepolymeric mixtures can be modified by using small amounts of poly(oxyethylene-oxypropylene) polyols sold under the trademark "Pluronic", such as "Pluronic"-L35, F38, and P46, or hydrophilic polyols with hetero oxyethylene-oxypropylene chains sold as Polyol Functional Fluids, such as WL-580, WL-600 and WL-1400.

Polyisocyanates which can be used to prepare the isocyanate-terminated prepolymer used in this invention and described above include conventional aliphatic and aromatic polyisocyanates. The preferred polyisocyanates are aromatic polyisocyanates because the prepolymers made therefrom will generally react faster with water. One of the most useful polyisocyanate compounds which can be used for this purpose is tolylene diisocyanate, particularly as a blend of 80 weight percent of tolylene-2,4-isocyanate, and 20 weight percent of tolylene-2,6-isocyanate; a 65:35 blend of the 2,4- and 2,6-isomers is also usable. These polyisocyanates are commercially available under the trademark "Hylene" T, "Nacconate 80", and "Mondur" RD-80. Other usable polyisocyanate compounds which can be used are other isomers of tolylene diisocyanate, hexamethylene-1,6-diisocyanate, diphenyl-methane-4,4'-diisocyanate, m- or p-phenylene diisocanate and 1,5-naphthalene diisocyanate. Polymeric polyisocyanates can also be used, such as polymethylene polyphenyl polyisocyanates, such as those sold under the trademarks, "Mondur" MRS, and "PAPI". A list of useful commercially available polyisocyanates is found in *Encyclopedia of Chemical Technology* by Kirk and Othmer, 2nd Ed., Vol. 12, pages 46, 47, Interscience Pub. (1967).

The polyurethane prepolymers used in the practice of the present invention are liquids or greasy or pasty solids at room temperature. They are reactive in the presence of water to form a cross-linked, water-insoluble, water-containing gelatinous mass having a high degree of elasticity and a relatively high compression strength, e.g., 5 to 15 psi at 20% compression when tested according to American Standard Test Method No. D-10-56. Reaction times to convert the prepolymer to the gel in the presence of water may be on the order of less than a minute to several hours. If needed, the polyurethane prepolymer may be dissolved in a suitable water-miscible organic solvent to facilitate handling.

The solvents which may be used if needed to dissolve the prepolymers are aprotic, water-miscible, polar organic solvents which are preferably volatile at the ambient conditions of the environment. Other useful water-miscible solvents include methyl acetate, tetrahydrofuran, dimethyl formamide, ethylene glycol monoethyl ether acetate (sold under the trade designation "Cellosolve" acetate), diethyl acetal, acetone and methylethylketone.

The water-reaction product of the prepolymer is a gelatinous mass, sometimes referred to herein as a gel or hydrogel. While the reaction produces by-product carbon dioxide, which normally produces a foamed structure in a cured polyurethane, foaming of the gelatinous mass is normally not noted since the amount of carbon dioxide by-product produced will generally be readily dissolved in the water contained within the gelatinous mass and/or readily liberated from the water or the gel because of the low viscosity of the gel precursor. This is particularly true for water to prepolymer ratios greater than 5:1 by weight. The invention is further illustrated by the following examples wherein all parts are by weight unless otherwise specified.

EXAMPLES

Polyurethane Prepolymer

A polyurethane prepolymer was made by reacting 4800 molecular weight polyether copolymer containing 70–90% poly(oxy)ethylene units of by weight and 10–30% poly(oxy) propylene units by weight having hydroxyl termination with toluene diisocyanate at an equivalence ratio of 2.2:1 NCO:OH. The reactants were processed without solvent for approximately 4–6 hours at 75° C. until the calculated theoretical NCO:OH ratio was obtained. A small amount of benzoyl chloride (0.04% by weight) based on the total reactant weight was added for inhibition of side reactions. Acetone was added to provide 80% by weight solids.

CHELATING AGENT "A"

Partially epoxidized cis-1,4-polybutadiene reacted with dimethylamine

In a 1-liter, round bottom flask heated at 62° C. and equipped with stirrer, dropping funnel, thermometer, nitrogen inlet, and reflux condenser, was placed a solution consisting of 22.5 grams cis-1,4-polybutadiene rubber (commercially available from B. F. Goodrich Chemicals, Inc. under the trade designation "Ameripol" CB-220) dissolved in 240 grams of toluene. Thereafter, 4.1 grams of formic acid was added to the flask. The mixture was continuously stirred and heated until it again reached 62° C. whereupon 60 grams of 35 weight percent aqueous hydrogen peroxide solution was added dropwise over a 25 minute period to control the resulting exotherm so that the temperature did not exceed 66° C. Upon completion of the addition of the hydrogen peroxide solution, the mixture was maintained at 66° C. for a 4 hour period at which time the epoxy equivalent was found to be 131 by titration with hydrobromic acid in glacial acetic acid. Next 125 g of a 25% solution of dimethylamine in methanol was added slowly over a 1 hour period to control any exotherm. The stirred mixture was kept at 67° C. for 15 hours until a small sample was found to be soluble when added to hot water. At this stage, the reaction mixture was a creamy tan emulsion.

When all solvent and reactants were removed under vacuum, a solid, tan, water-soluble polymer with a nitrogen content of 4.5% resulted.

CHELATING AGENT "B"

Substantially epoxidized cis-1,4-polybutadiene reacted with diethylamine

A polymer consisting of 98 percent epoxidized cis-1,4-polybutadiene was prepared as follows:

| Solution A | |
|---|---|
| cis-1,4-polybutadiene ($M_n$ = 98,000) analysis 98% main chain olefin units and 2% vinyl units resulting from 1,2-butadiene addition) | 150 grams |
| methylene chloride | 3000 ml. |
| Solution B | |
| peracetic acid solution (40% peracetic acid, 40% acetic acid 13% water, 5% hydrogen peroxide and 2% sulfuric acid) | 530 grams |
| sodium acetate (buffering agent) | 36.8 grams |

Solution B was slowly added to solution A from a dropping funnel over a 40 minutes period, the temperature of the mixture being maintained below 30° C. The mixture was then reacted for an additional 3½ hours while maintaining a temperature of less than 25° C. The resulting epoxidized polymer was precipitated in methyl alcohol, redissolved in p-dioxane and reprecipitated in distilled water.

A solution of 305 g of the 98% epoxidized polybutadiene in dioxane (6.85% by weight) was heated to about 60° C. with stirring. To the solution was added a solution of 102 g of diethylamine and 50 g of water. The mixture was heated to reflux (76° C.) for about 10–20 hours until a small sample completely dissolved when stirred for a few seconds into hot water.

Water (200 g) was added to the stirred solution and more heat applied until an atmospheric distillation resulted. The distillation was carried out over several hours and a total of 700 g of additional water was incrementally added. The process was terminated when all dioxane and amine were removed from the reaction mixture. The resulting solution was an aqueous solution of the water soluble polymer. A dried sample of the polymer had a nitrogen value of 0.5%.

This corresponds to a hydroxyalkylene amine equivalent weight of about 2800. NMR analysis showed the remainder of the water soluble polymer consisted of about 95% 2,5-oxolanylene units and 5% 2,3-epoxybutylene units.

CHELATING AGENT "C"

2,5-oxolanylene polymer having 90–80 mole percent 2,5-oxolanylene units and 10–20 mole percent oxirane units was prepared by heating a solution of 30 parts of substantially epoxidized cis-1,4-polybutadiene (described in the preparation of Chelating Agent "B") in 730 parts dioxane with 111 parts of a 10% by weight solution of tetrabutylammonium hydroxide in methanol at 75° C. for approximately 8 hours.

CHELATING AGENT "D"

Epoxidized polybutadiene was prepared and reacted with diethyl amine, as in the preparation of Chelating Agent "B", to the same point of hot water solubility.

The polymer was isolated by precipitating into ether, removing the solid polymer and drying. The polymer had a nitrogen value of 0.5% which corresponds to a hydroxyalkylene amine equivalent weight of about 2800. NMR analysis of the water-insoluble polymer showed the remainder was composed of about 89% unchanged 2,5-epoxybutylene units and 11% 2,5-oxolanylene units.

CHELATING AGENT "E"

To a dioxane solution of poly(glycidyl methacrylate) containing 5 g of polymer was added 5.0 ml of redistilled piperidine. The mixture was kept under reflux with stirring overnight, then diluted with 500 ml of methanol. The volume was reduced to less than 100 ml in vacuo. This was repeated with 500 ml methanol, and sufficient methanol was added to the residue to yield a 5% solids solution.

The polymer had a nitrogen content of 6.16%, corresponding to near theoretical conversion of oxirane groups to hydroxyalkylene amine groups.

EXAMPLES 1–14

The polyurethane prepolymer identified above was utilized to gel various water samples containing potassium picrate in solutions first treated with Chelating Agents "A", "B", and "C". The chelating agents were employed as solutions. The concentrations of the chelating agents were as follows: "A" 5 weight percent solution in water, "B" 6 weight percent solution in 1:1 methanol:ethanol, and "C" 5.5 weight percent in 3:1 methanol:acetone.

Table I shows the amount of chelating agent, volume of potassium picrate solution, volume of water, and the weight of the polyurethane prepolymer for each test example.

Each of the compositions produced a bright yellow gel. Each gel was soaked in 250 ml of water for a total of 20 days and the color of the supernatant liquid was observed after this time. Using a scale of 0–10, where zero shows no discoloration of the water and 10 represents a maximum color obtainable using a 0.5% solution of potassium picrate as a control, the results are shown in Table II as a function of time in days.

TABLE I

| | EXAMPLE NUMBER | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Polyurethane Prepolymer (g) | 10 | 10 | 10 | 10 | 10 | 10 | 10 | 10 | 10 | 10 | 10 | 10 | 10 | 10 |
| Deionized water (ml) | 78 | 70 | 78 | 78 | 70 | 70 | 78 | 78 | 70 | 70 | 78 | 78 | 70 | 70 |
| 0.5% by weight potassium picrate solution (ml) | 2 | 10 | 2 | 2 | 10 | 10 | 2 | 2 | 10 | 10 | 2 | 2 | 10 | 10 |
| Chelating Agent solution (g) | | | | | | | | | | | | | | |
| A | — | — | 2 | 5 | 2 | 5 | — | — | — | — | — | — | — | — |

TABLE I-continued

| | EXAMPLE NUMBER | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| B | — | — | — | — | — | — | 2 | 5 | 2 | 5 | — | — | — | — |
| C | — | — | — | — | — | — | — | — | — | — | 2 | 5 | 2 | 5 |

TABLE II

| Time (days) | EXAMPLE NUMBER | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| one | 5 | 10 | 3 | 3 | 5 | 6 | 0 | 0 | 3 | 3 | 5 | 9 | 6 | 7 |
| five | 6 | 10 | 5 | 3 | 8 | 8 | 1 | 0 | 4 | 4 | 7 | 8 | 6 | 7 |
| twenty | 8 | 10 | 7 | 6 | 10 | 10 | 1 | 0 | 4 | 4 | 7 | 9 | 8 | 9 |

The results of Table II reveal that certain of the chelating agents have a higher ability to complex the picrate ion than other chelating agents. The results also show that gels formed of materials which were not initially complexed with a chelating agent will have a relatively higher concentration of preparation in the solution.

EXAMPLES 15-20

As a test for leachability, an organic dye, azobenzylsulfonate available from the DuPont Company under the trade name "Pontamine Fast Red 8BLX" and also known as "Direct Red 81", was complexed with the chelating agents identified in Table III and subsequently gelled with the polyurethane prepolymer identified above. The various formulations are shown in Table III.

TABLE III

| | Example Number | | | | | |
|---|---|---|---|---|---|---|
| | 15 | 16 | 17 | 18 | 19 | 20 |
| polyurethane prepolymer (g) | 10 | 10 | 10 | 10 | 10 | 10 |
| dye (g) | 0.2 | 0.2 | 0.2 | 0.2 | 0.2 | 0.2 |
| Chelating agent "A" (g) | — | 2 | — | — | — | — |
| Chelating agent "B" (g) | — | — | 2 | 0.2 | — | — |
| deionized water (ml) | 80 | 80 | 80 | 80 | 80 | 80 |
| Chelating agent "D" (g) | — | — | — | — | 2 | — |
| Chelating agent "E" (g) | — | — | — | — | — | 2 |

All of the gel samples were cast in a rectangular mold having a total volume of 22 cc. Two samples of each formulation were prepared. One sample was immediately placed in 250 ml water and the other allowed to shrink by evaporation. After one week at about 40° C., the samples were allowed to shrink by water evaporation were only about 2.5 cc in volume. The dye, being very water soluble, leaches readily into water if not bound into the gelled mass by the chelating agent. Each sample was placed into 250 ml of water after the initial experiments to determine if the dye leached from the gel. Table IV shows the results. If the dye leached into the water a (+) symbol was used, if no dye leached a (−) symbol was used.

TABLE IV

| Leach Tests | Example Number | | | | | |
|---|---|---|---|---|---|---|
| | 15 | 16 | 17 | 18 | 19 | 20 |
| 1 day | (+) | (−) | (−) | (−) | (−) | (−) |
| 7 day | (+) | (−) | (−) | (−) | (−) | (−) |
| 14 day | (+) | (−) | (−) | (−) | (−) | (−) |

The test water was decanted from the sample, put into a test tube and viewed against a fluorescent light source.

We claim:
1. A treatment method comprising:
   (1) mixing waste water containing a contaminant chemical component with a chelating agent capable of forming a complex with said component, said chelating agent being selected from the group consisting of
      (A) a polymer containing the β-hydroxyalkylene amine moiety characterized by having an equivalent weight of hydroxyalkylene amine of 87 to 10,000; and
      (B) 2,5-oxolanylene polymer characterized by including recurring 2,5-oxylanylene (or oxolene) units of the formula

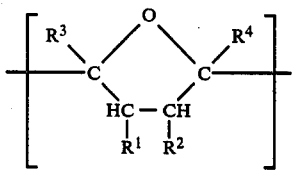

wherein at least 60% of the units are joined directly to one another so as to provide segments containing at least six units and wherein $R^1$, $R^2$, $R^3$ and $R^4$ are individually hydrogen or alkyl groups containing up to 8 carbon atoms
   (2) mixing the resultant mixture with a water soluble polyurethane prepolymer having terminal isocyanate groups capable of being polymerized in the presence of water in a sufficient quantity to form a self-supporting transportable gelled mass.

2. The method of claim 1 wherein said β-hydroxyalkylene amine-containing moiety is selected from the group consisting of

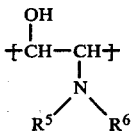 (a)

wherein $R^5$ is hydrogen or alkyl having from 1 to 8 carbon atoms and $R^6$ is alkyl having from 1 to 8 carbon atoms or $R^5$ and $R^6$ are combined to form a heterocyclic ring having the formula

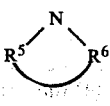 (b)

-continued

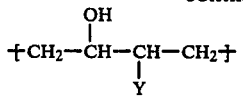

wherein Y is an amino group;

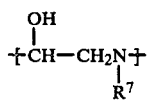 (c)

wherein $R^7$ is hydrogen or alkyl having 1 to 8 carbon atoms;

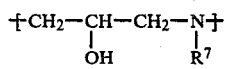 (d)

wherein $R^7$ is as defined above; and

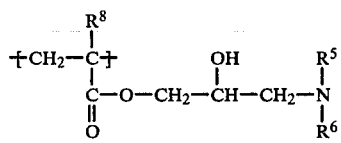 (e)

wherein $R^8$ is hydrogen or methyl and $R^5$ and $R^6$ are as defined above.

3. The method of claim 1 wherein said 2,5-oxolanylene polymer comprises
   (a) from about 10–100 mole percent 2,5-oxolanylene units
   (b) from about 0–90 mole percent of blocks of units of the formula

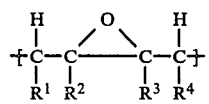

wherein $R^1$, $R^2$, $R^3$ and $R^4$ have been defined above, and (c) from about 0 to 75 mole percent of blocks of units of the formula

wherein $R^9$ is hydrogen or methyl and $R^{10}$ is phenyl, cyano or —COOCH$_3$.

4. The method of claim 1 wherein mixing steps (1) and (2) are accomplished substantially simultaneously.

5. The method of claim 1 further including the step of evaporating water from said gelled mass.

6. The method of claim 1 wherein said β-hydroxyalkylene amine-containing polymer is selected from the group consisting of (1) the water soluble reaction product of dimethylamine with partially epoxidized poly-cis-1,4-butadiene, (2) the water soluble reaction product of diethylamine with fully epoxidized poly-cis-1,4-butadiene wherein the unreacted 2,3-epoxybutylene groups are predominantly isomerized to 2,5-oxolanylene groups, (3) the water soluble reaction product of piperidine with polyglycidyl methacrylate, (4) the reaction product of diethylamine with fully epoxidized poly-cis-1,4 butadiene wherein the unreacted 2,3-epoxybutylene groups are not isomerized, (5) the water soluble condensation product of epichlorohydrin and methylamine (6) the water soluble polymer comprising the reaction of an amine selected from the group of dimethylamine, diethylamine, diethanolamine, morpholine, and piperidine with an epoxy containing polymers selected from the group of epoxidized poly-cis-1,4-butadiene, epoxidized styrene-b-butadiene, and epoxidized styrene-co-butadiene.

7. The method of claim 1 wherein said contaminant is radioactive.

8. The method of claim 1 wherein said contaminant is selected from the group consisting of gold, silver, platinum, or salts thereof.

9. A composition comprising:
   (1) a chemical component complexed with a chelating agent selected from the group consisting of
      (A) β-hydroxyalkylene amine-containing polymers characterized by having an equivalent weight of hydroxyalkylene amine of 87 to 10,000; and
      (B) 2,5-oxolanylene polymer characterized by including recurring 2,5-oxylanylene (or oxolene) units of the formula

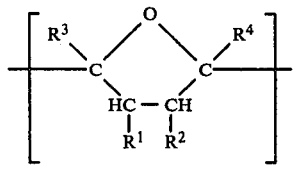

wherein at least 60% of the units are joined directly to one another so as to provide segments containing at least six units and wherein $R^1$, $R^2$, $R^3$ and $R^4$ are individually hydrogen or alkyl groups containing up to 8 carbon atoms; and (2) a gelled mass resulting from the reaction of a water soluble polyurethane prepolymer having terminal isocyanate groups with water.

10. The composition of claim 9 wherein said β-hydroxyalkylene amine-containing moiety is selected from the group consisting of

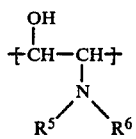 (a)

wherein $R^5$ is hydrogen or alkyl having from 1 to 8 carbon atoms and $R^6$ is alkyl having from 1 to 8 carbon atoms or $R^5$ and $R^6$ are combined to form a heterocyclic ring having the formula

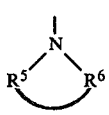 (b)

-continued

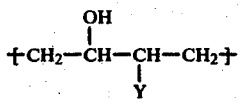

wherein Y is an amino group;

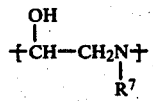 (c)

wherein $R^7$ is hydrogen or alkyl having 1 to 8 carbon atoms;

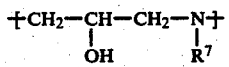 (d)

wherein $R^7$ is as defined above; and

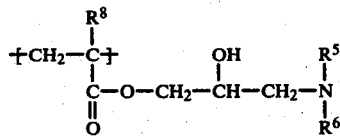 (e)

wherein $R^8$ is hydrogen or methyl and $R^5$ and $R^6$ are as defined above.

11. The composition of claim 9 wherein said 2,5-oxolanylene polymers comprise
 (a) from about 10–100 mole percent 2,5-oxolanylene units
 (b) from about 0–90 mole percent of blocks of units of the formula

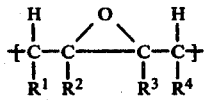

wherein $R^1$, $R^2$, $R^3$ and $R^4$ have been defined above, and
 (c) from about 9 to 75 mole percent of blocks of units of the formula

wherein $R^9$ is hydrogen or methyl and $R^{10}$ is phenyl, cyano or —$COOCH_3$.

12. The composition of claim 9 wherein said β-hydroxyalkylene amine-containing polymer is selected from the group consisting of (1) the water soluble reaction product of dimethylamine with partially epoxidized poly-cis-1,4-butadiene, (2) the water soluble reaction product of diethylamine with fully epoxidized poly-cis-1,4-butadiene wherein the unreacted 2,3-epoxybutylene groups are predominantly isomerized to poly-2,5-oxolanylene groups, (3) the water soluble reaction product of piperidine with polyglycidyl methacrylate, (4) the reaction product of diethylamine with fully epoxidized poly-cis-1,4-butadiene wherein the unreacted 2,3-epoxybutylene groups are not isomerized, (5) the water soluble condensation product of epichlorohydrin and methylamine (6) the water soluble polymer comprising the reaction product of an amine selected from the group of dimethylamine, diethylamine, diethanolamine, morpholine, and piperidine with an epoxy containing polymers selected from the group of epoxidized poly-cis-1,4-butadiene, epoxidized styrene-b-butadiene, and epoxidized styrene-co-butadiene.

* * * * *